United States Patent Office 3,119,840
Patented Jan. 28, 1964

3,119,840
PREPARATION OF 2-p-DIOXANONE BY DEHYDROGENATING DIETHYLENE GLYCOL IN THE PRESENCE OF ADDED HYDROGEN
Raymond L. Mayhew, Phillipsburg, N.J., and Samuel A. Glickman, Easton, Pa., assignors to General Aniline & Film Corporation, New York, N.Y., a corporation of Delaware
No Drawing. Filed Dec. 19, 1958, Ser. No. 781,458
5 Claims. (Cl. 260—340.2)

The present invention relates to 2-p-dioxanone and particularly to an improved process of preparing the same from diethylene glycol.

2-p-dioxanone is a well known organic compound having many interesting and useful applications in organic syntheses. There are several methods for preparing it while employing diethylene glycol as the starting material. One method employs the dehydrogenation of diethylene glycol in the presence of a metallic dehydrogenating catalyst at a temperature of 240° to about 360° C. A copper chromite catalyst is used and the reaction is carried out in the vapor phase with an overall yield of about 25%. The other method, more recent, comprises dehydrogenating diethylene glycol in the liquid phase in the presence of a copper chromite catalyst containing from 10 to 50% by weight of chromium. The maximum yield obtainable is about 81%.

It is an object of the present invention to provide an improved process of preparing 2-p-dioxanone from diethylene glycol in yields well over 95%.

Other objects and advantages will become more clearly manifest from the following description.

We have discovered that 2-p-dioxanone can be obtained in substantially quantitative yields with substantially no side reaction by passing the vapors of diethylene glycol over a catalyst bed containing copper supported on a suitable carrier in the presence of added hydrogen gas at a temperature of 200–400° C., preferably at 250°–350° C. either at atmospheric pressure, reduced or elevated pressure. The surprising and unexpected effect of our process is that improved yields, minimized side reaction and prolonged catalyst life are obtained by the use of added hydrogen. In the best process of the prior art, employing copper chromite as a catalyst, a yield of only 81% is obtained. By the use of added hydrogen, we have discovered that the yields are substantially quantitative. This is unexpected since one might predict that a dehydrogenation reaction should be conducted in the presence of as little hydrogen as possible in order to influence the reaction in the desired direction, i.e., to give the highest yield possible. This however, we have found to be contrary in the present case.

During the course of our experimentation, we found that added hydrogen engenders long catalyst life, higher yields, minimal side reaction, but the amount of hydrogen produced in the dehydrogenation of diethylene glycol (2 moles of hydrogen to 1 mole of diethylene glycol) is not sufficient to effect these results. By painstaking investigation and research, we found that about 1 mole of diethylene glycol to about 3 moles of added hydrogen are much more effective and that mole ratios up to 100 moles of hydrogen per mole of diethylene glycol may be used advantageously. Depending somewhat on the previous history of the catalyst the ratio of 6 to 20 moles of hydrogen to 1 mole of diethylene glycol is preferable. Inert gaseous diluents, such as nitrogen, may be present in addition to the hydrogen.

As the dehydrogenating catalyst, we have found that while iron, chromium, nickel, etc. and their oxides may be employed, excellent results however, are obtained with reduced copper supported on a carrier such as pumice, asbestos, carbon, amorphous silica, glass beads, sand, clay and the like.

PREPARATION OF CATALYST

While there are several ways of preparing the reduced copper catalyst, we have found that by adding to granular pumice sufficient basic copper carbonate together with water and sodium silicate to produce ultimately a supported catalyst containing 3–8% of copper results in a very effective catalyst for our purpose. For the purpose of the present invention, we prepared a reduced copper catalyst containing 5% copper. This catalyst is generated by drying, heating to about 210° C. and then passing hydrogen over the mass at 210° C. for about 15 hours or until substantially all of the copper has been reduced.

The temperature for the dehydrogenation of diethylene glycol, as noted above, may range from 200°–400° C. However, the preferred temperature is within the range of 250–350° C. The reaction is carried out in the vapor phase and accordingly must be within the temperature range and under conditions at which the diethylene glycol is a vapor. Thus, if for example, operation of the process at a temperature below the normal atmospheric boiling point of diethylene glycol were desired, reduced pressure would be required except as the presence of the added hydrogen may change the vaporization characteristics of the diethylene glycol and the final product, 2-p-dioxanone. The dehydrogenation reaction nevertheless occurs over the wide temperature range of 200°–400° C. It is quite possible to operate the reaction as low as about 200° C. or even lower, but in these cases the conversion rate will be diminished. The preferred temperature is about 250° C. or above.

The rate at which the dehydrogenation reaction is conducted will depend on many factors, among which include the size of the reactor, the dimensions of the reactor, the temperature, the age of the catalyst, the completeness desired of the reaction and the ability of the heating elements to supply heat for the reaction and to maintain the selected temperature range. In general however, we have found that a point of departure may be taken at a residence time of 10 seconds. In some cases this may be considerably shortened or if desired the period may be lengthened depending upon the aforementioned factors. While for practical purposes excellent results are obtained while operating at atmospheric pressure, we have found that the dehydrogenation reaction may also be conducted at either reduced or elevated pressure. Pressures such as for example, 5 or 10 atmospheres, have no deleterious effect whatsoever and in some cases may be desirable in order to increase residence time, etc.

The following examples will further illustrate the improved process of the present invention and will show the advantages over the prior art methods.

Example 1

900 grams of the reduced copper catalyst supported on pumice prepared as above described, occupying a dehydrogenation reactor of 1.8 liters capacity was heated to 250° C. Over this catalyst bed was led, per hour, the vapors of 184.5 grams of diethylene glycol together with 9.5 cubic feet (measured at 70° F.) hydrogen gas. At steady state conditions, 172 grams of product were condensed at room temperature. This product was found by analysis (saponification factor) to contain 90.2% of 2-p-dioxanone. This corresponds to about 88% conversion and 96% yield. The remainder was unreacted diethylene glycol. Minor spectrographic trace products of the reaction included methane, ethylene, carbon monoxide, carbon dioxide and a carbonyl group containing material presumably formaldehyde but not further identified. The product may be used directly, or employed for other reactions or subjected to further purification such as crystallization, distillation, recycling through the reactor, etc.

Example II

During one of the experimental runs, a sample analyzing 88.3% of 2-p-dioxanone was obtained and fractionated. After a forecut of 2½%, most of the product analyzed over 98% and samples of 99.9% purity were obtained. In the fractions 99.1% of the 2-p-dioxanone was accounted for.

Example III

During our experimentation, one run yielded a sample analyzing 86.4% of 2-p-dioxanone. The sample was allowed to crystallize at 17° C. The crystals were separated and upon analysis showed a purity of 98.2% of 2-p-dioxanone.

The structure of 2-p-dioxanone in all of the foregoing cases was confirmed by comparison of physical and chemical properties with those given in the literature, such as infra red spectrum, refractive index elemental analysis, saponification factor, etc.

Example IV

At about 60 hours of accumulated time on stream under varying experimental conditions, a product was being obtained analyzing 80.1% of 2-p-dioxanone at l.h.s.v. (liquid hourly space velocity) of 0.0907, the hydrogen rate in this case being 6.3 cubic feet per hour measured at 70° F. A composite sample averaged 79.3%. A sample taken 94 minutes later was 80.1%. This illustrates rather constant conversion over considerable period in the presence of the hydrogen. At this point the hydrogen flow was discontinued and nitrogen gas substituted. The rate here was 3.1 cubic feet per hour. All other influences were undisturbed. After 40 minutes, the effluent analyzed 72.5% 2-p-dioxanone. In another 67 minutes the analysis was 49.9%. After 4 more hours on stream, 25% was found. After 3 more hours 19.9% was found. Finally 20 minutes later, a low of 17.2% was found. This illustrates a rapid diminution of catalyst activity when hydrogen is discontinued. Then the nitrogen was discontinued and hydrogen resumed at about 9 cubic feet per hour. After 2½ hours later the product was at 24.6%, in 2 more hours of operating, with an interruption between, the product was at 38%. After 5 more hours the analysis rose to 42.1%. This graphically illustrates the beneficial effect of the hydrogen in restoring the catalyst activity.

The foregoing examples clearly illustrate the bad effects caused by an absence of hydrogen. When hydrogen is used, the catalyst life was much longer and the activity thereof fell off very gradually as indicated by the very slow falling off of the 2-p-dioxanone content of the effluent. When nitrogen was substituted for the hydrogen, the rate of conversion fell off immediately and continued to diminish rapidly. This obviously was due to the rapidly diminishing catalytic activity since the residence time was actually lengthened when nitrogen gas was used. It is interesting to note from the foregoing example however, that when hydrogen was again reemployed the rate of conversion began to improve slowly. It thus becomes clearly manifest that the effect of the hydrogen is not only preventive but somewhat curative as well. The effect on the catalyst which occurred when nitrogen was used is fairly permanent since the activity was improving but slowly and the catalyst probably would have to be burned off and regenerated before original efficiency would be restored.

Example V

Example I was repeated with the exceptions that the catalyst was quite old and rather inactive, and no gas, i.e., hydrogen or nitrogen, was introduced over the catalyst bed. The first sample of effluent analyzed 50% 2-p-dioxanone which is similar to that obtained previously at the same rate using the same catalyst with added hydrogen. After the passage of 50 minutes, the analysis was 38.2%. After 2½ hours of additional reaction, the effluent gave an analysis of 33.2%. These results further illustrate clearly the rapid decline in activity of the catalyst when the use of added hydrogen is omitted. It is interesting to note that the residence time is increased when additional hydrogen is not employed. Thus it appears that one would expect greater conversion rather than less if the hydrogen were not beneficial. It may also be noted that this example together with Example IV above, illustrate the specificity of hydrogen in preference to nitrogen.

It is not known exactly how the added hydrogen exercises its beneficial effect. It is our conjecture that among the possible explanations may be in the heat transfer where individual sites on the catalyst when exothermic side reactions occur may be cooled to prevent propagation of the reaction or catalyst poisons may be destroyed by hydrogen, or polymerization of the product prevented. Regardless what other possible mechanisms may be conceived, the surprising effect is that substantially quantitative yields are obtained through the use of added hydrogen while employing the foregoing temperatures and pressures.

We claim:

1. The process of preparing 2-p-dioxanone which comprises dehydrogenating diethylene glycol in the vapor phase in the presence of a dehydrogenating catalyst in the presence of 3–100 moles of added hydrogen.

2. The process of preparing 2-p-dioxanone which comprises dehydrogenating diethylene glycol in the vapor phase in the presence of a dehydrogenating catalyst in the presence of 6–20 moles of added hydrogen.

3. The process according to claim 1 wherein the dehydrogenating catalyst contains from 3 to 8% by weight of copper.

4. The process of preparing 2-p-dioxanone which comprises dehydrogenating diethylene glycol in the vapor phase at 250° C. in the presence of 6 moles of hydrogen per mole of diethylene glycol and in the presence of a dehydrogenating catalyst consisting of reduced copper supported on pumice as a carrier and containing 5% by weight of copper.

5. In a process for the preparation of 2-p-dioxanone which comprises dehydrogenating diethylene glycol in the vapor phase in the presence of a dehydrogenating catalyst, the improvement which comprises conducting the reaction in the presence of added hydrogen.

References Cited in the file of this patent

UNITED STATES PATENTS

| | | |
|---|---|---|
| 2,142,033 | McNamee et al. | Dec. 27, 1938 |
| 2,807,629 | Bell | Sept. 24, 1957 |

OTHER REFERENCES

Shuikin et al.: "Chemical Abstracts," volume 46, pages 10818–10819 (1952).

Shuikin et al.: "Chemical Abstracts," volume 48, page 49401 (1954).